Patented Oct. 7, 1924.

1,510,679

UNITED STATES PATENT OFFICE.

SAMSON KATZPROWSKY, OF NEW YORK, N. Y.

ART OF PRESERVING FRUIT.

No Drawing. Application filed October 21, 1922. Serial No. 596,151.

*To all whom it may concern:*

Be it known that I, SAMSON KATZPROWSKY, a citizen of Poland, residing at New York city, New York, have invented a certain new and useful Improvement in the Art of Preserving Fruit, of which the following is a clear, full, and exact description.

This invention relates to the treatment of fruits which are dried, such, for example, as prunes, raisins, figs, etc., and particularly to a process of treating such fruits either before or after drying whereby the fruits are preserved with an appearance of freshness and whereby the sugaring, which frequently appears upon dried fruits, is checked.

Other objects of the invention and advantages obtained by the practice of the process will appear hereinafter.

For the purposes of illustration, the invention will be described in connection with its application to the treatment of prunes, but it will be understood, of course, that it is not restricted to any particular type of fruit and that it may be equally employed with other fruits such as figs, raisins, etc.

The purpose of the treatment is to provide the fruit with a protective covering which will check the sugaring and preserve the freshly dried appearance of the fruit without in any way interfering with its wholesomeness. To this end I employ a solution containing pectin or its derivatives. Pectin is a constituent of various fleshy fruits such as apples and pears, and is also found in roots such as carrots and turnips and may be obtained, for the purposes of this invention, by boiling fruit or vegetables containing pectin, whereby the pectin is extracted.

It is desirable, for the purposes of this invention, that the pectin solution contain some acid (0.5%), and if the product be found to be lacking in acid, an acid such as citric acid, tartaric acid, etc., may be added. The final product should contain about .75% pectin or more.

The exact method of procedure in the treatment of the fruit will vary somewhat with the condition of the fruit and with the climatic conditions, according as the fruit is sound or unsound, or the climate is wet or dry. In some cases it may be best to extract the pectin from plants or fruits containing little or no sugar, as, for example, from the white portions of citrous fruit peel. In most cases, however, it will be found more advantageous to extract the pectin from fruit high in sugar, or to add sugar to the extracted pectin so that the final solution will contain, in addition to the proper amount of pectic acid, also from 20% to 25% of sugar.

In the treatment of prunes, for example, I may use some of the prunes as a source of the pectin for treating the other prunes, proceeding in the following manner: If the prunes are dried, they are mashed, or soaked and mashed, and the pectin extracted by boiling the prunes in water until the solution contains .75% to 1% of pectin. The solution thus prepared will contain the proper amount of acid and from 20% to 25% of sugar.

The dried prunes to be packed are dipped first in boiling water, as usual, and then are immersed for about three minutes in the above solution, which is kept at preferably from 85° to 90° C. The prunes are then dried for a few minutes to dry off the surface and at the same time concentrate the sugar on the surface. This treatment produces a tough and dry (jelly-like) envelope which will constitute a wholesome artificial skin around each fruit, this skin serving both to prevent the sugaring of the fruit and to give to the fruit a freshly dried appearance.

What I claim as new is:

1. A method of preserving fruit which comprises drying the fruit and thereafter covering the fruit with a thin coating of material containing pectin.

2. A method of preventing deterioration of dried fruit, which comprises coating the fruit with a vegetable material containing pectin, and thereafter drying the coat thereon to attain a transparent preserving envelope adapted to prevent the crystallization of sugar on the surface of the fruit.

3. A method of preventing the deterioration of dried fruit, which comprises immersing the fruit in a solution containing at least .75 per cent of pectin, withdrawing the fruit, and allowing the adhering solution thereon to dry to attain a transparent protecting envelope on the fruit adapted to prevent crystallization of sugar on the surface thereof, 4. That improvement in the art of preserving fruit which consists in drying the fruit and thereafter covering the fruit with an envelope of material comprising pectin and dissolved sugar, whereby sugaring on the surface of the fruit is prevented.

5. A method of preventing the deterioration of dried fruit, which comprises immersing the fruit in a solution containing pectin, sugar, and acid heated to a temperature of approximately 90 degrees centigrade, removing the fruit from the solution, and permitting the solution adhering thereto to dry to form a transparent preserving envelope around the fruit adapted to prevent the crystallization of sugar on the surface thereof.

6. Dried fruit completely covered with an adherent dry envelope of material, comprising pectin.

7. Dried fruit completely covered with an adherent envelope of material, comprising pectin and sugar.

8. Dried fruit completely covered with an adherent envelope of material, comprising pectin, sugar and acid.

Signed at New York city, New York, this 19th day of October, 1922.

SAMSON KATZPROWSKY.